March 4, 1930.　　　W. C. LAMBING　　　1,749,492
AUTOMATIC FUEL CONTROL FOR NATURAL GAS ENGINES
Filed Nov. 6, 1928　　　2 Sheets-Sheet 2
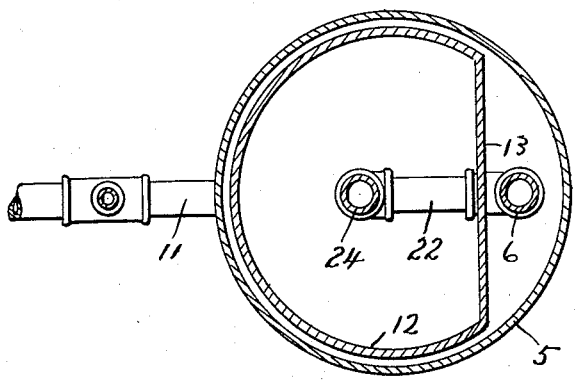
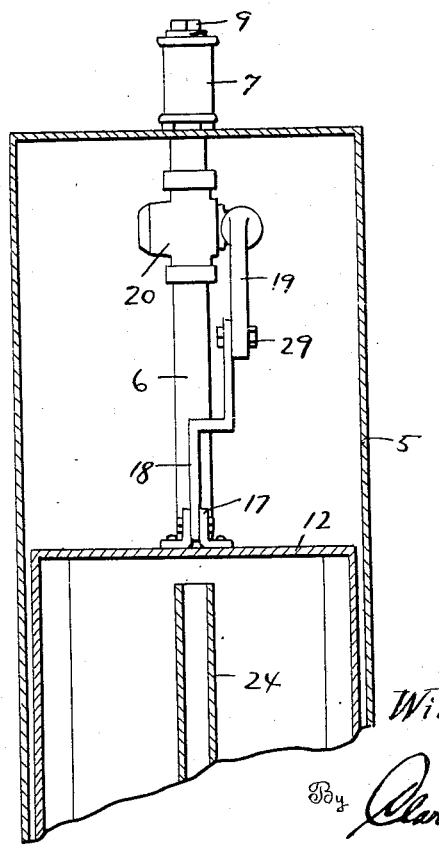

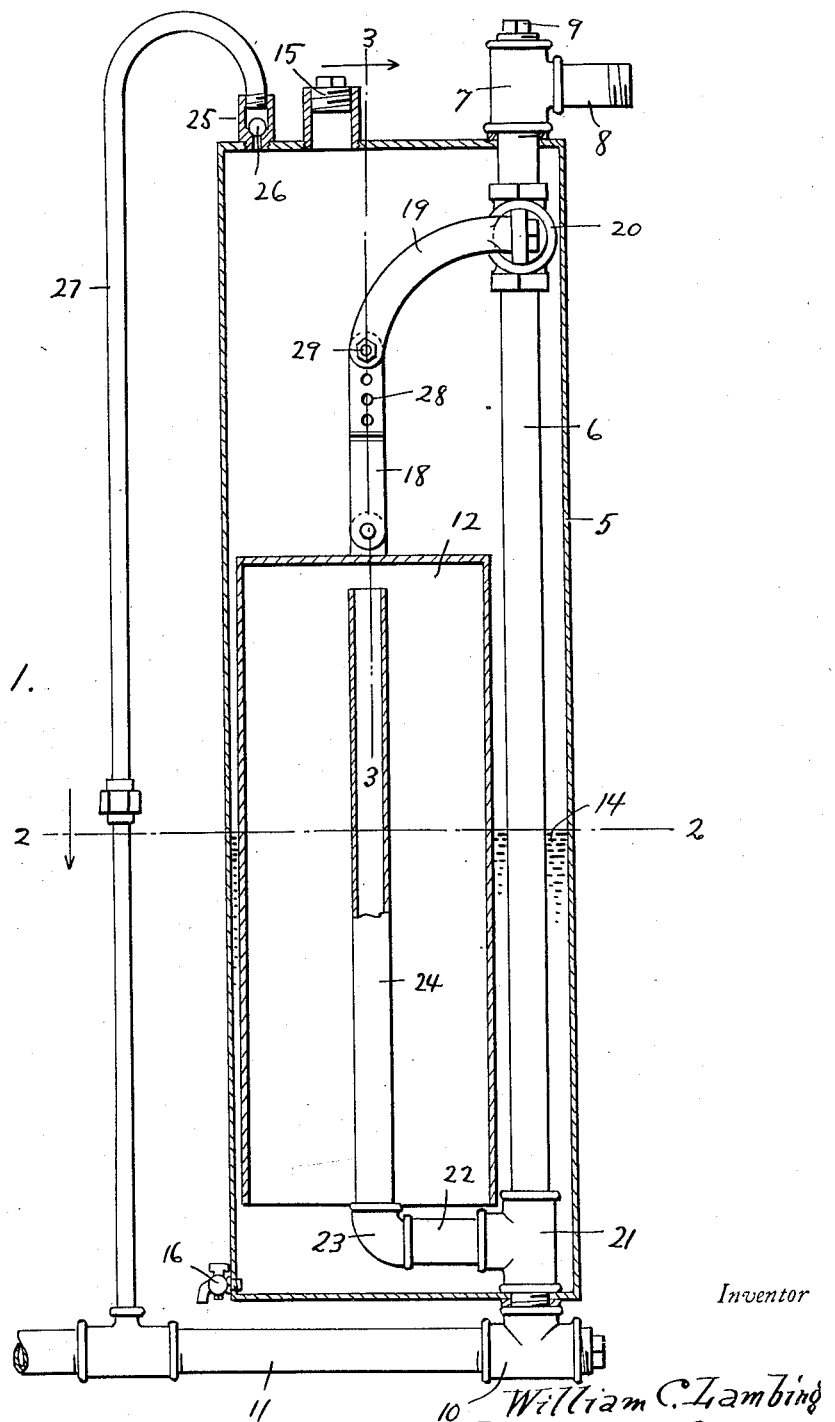

Patented Mar. 4, 1930

1,749,492

UNITED STATES PATENT OFFICE

WILLIAM CHARLES LAMBING, OF McDONALD, PENNSYLVANIA, ASSIGNOR OF ONE-THIRD TO T. J. BRITTON, OF CECIL, PENNSYLVANIA

AUTOMATIC FUEL CONTROL FOR NATURAL-GAS ENGINES

Application filed November 6, 1928. Serial No. 317,643.

The present invention relates to automatic fuel control devices for natural gas engines of a type adapted to regulate the feeding of the fuel to the engine in a uniform manner depending upon the consumption thereof during the operation of the invention.

The invention includes the provision of a float actuated valve controlling the feed line communicating with the engine and one of the principal objects of the invention resides in providing a closed container forming a housing for the float as well as the valve whereby to collect the gas which escapes from the valve through leakage and to provide a feed pipe for the gas thus collected in the housing communicating with the feed pipe of the engine.

It is customary in fuel feed devices of this character to provide a float chamber arranged for operating a valve in the feed pipe outwardly of said chamber and because of the necessity of fitting said valve so as to permit the free movement thereof, leakage occurs therein, resulting in a considerable loss of the fuel.

It is accordingly an object of the present invention to provide a float chamber with the fuel feed pipe extended therethrough and with the control valve disposed within the chamber so that the gas escaping from the valve will be collected in the float chamber and conveyed through an auxiliary feed pipe to the feed pipe communicating with the engine.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawing:

Figure 1 is a vertical sectional view through the float chamber illustrating the position of the fuel feed pipe and valve in position therein and in operative association with the float, Figure 2 is a transverse sectional view taken substantially along a line 2—2 of Figure 1, and Figure 3 is a fragmentary vertical sectional view taken substantially along a line 3—3 of Figure 1.

Referring now to the drawings in detail, wherein for the purpose of illustration I have disclosed a preferred embodiment of my invention, I provide a closed container 5, preferably of cylindrical formation and through which a fuel feed pipe 6 extends vertically therethrough, adjacent one side of the container.

The upper end of the feed pipe 6, outwardly of the container is fitted with a T-coupling 7 providing a connection for a feed pipe 8 communicating with a suitable supply tank or reservoir of a character well known in the art, the other of the connections of said coupling being provided with a plug 9. The lower end of the feed pipe 6, outwardly of the container 5 is also fitted with a T-coupling 10 to which is connected a pipe extension 11 communicating with the engine.

A float 12 is arranged within the container 5, having one side 13 thereof flattened, as clearly illustrated in Figure 2 of the drawings whereby to provide space within the container for the fed pipe 6. The float is open at its lower end and the container is partially filled with a quantity of crude oil as indicated at 14, or similar non-freezing liquid, a filler plug 15 being provided in the upper portion of the container for the purpose of admitting the liquid thereto.

A drain cock 16 is also fitted in the lower end of the container. Brackets 17 are secured to the top of the float to which is pivotally attached one end of a link 18 with its opposite end pivotally attached to a lever 19 of arcuate formation, as clearly illustrated in Figure 1 of the drawing, said lever being operatively connected with a valve 20 interposed in the feed pipe 6.

The feed pipe 6 is also provided with a T-coupling 21 positioned at the lower portion of the container and to which coupling is fitted a pipe extension 22 having an elbow 23 attached thereto for connecting a pipe extension 24 extending vertically within the float 12 and with its upper end terminating immediately beneath the upper portion of said float.

A ball cage 25 is attached to the upper portion of the container 5 with a ball 26 arranged therein and constituting a check valve, normally closing communication through the cage 25. A feed pipe 27 is attached at one end to the ball cage 25 and with its opposite end connected to the feed pipe 11 for communication with the engine.

In the operation of the device, the valve 20 is normally maintained in an open position for admitting gas through the pipes 8 and 6 into the pipe 11 and 24 for feeding the gas to the engine and the interior of the float respectively.

Should the engine be idle, the gas will pass through the pipe 24 into the float so as to move the same upwardly within the container and through the connection of the float with the valve 20 to close the valve and thus prevent the continued flow of gas through the feed pipes 6 and 8.

As soon as the engine is operated the gas will be sucked from the interior of the float through the pipes 11 and 24, thus permitting the lowering of the float and the subsequent opening of the valve 20 for feeding the gas directly through the pipes 6 to the engine.

In order to provide for the free action of the valve into its open and closed position, the same is loosely fitted within the pipe and consequently leakage of gas occurs into the container 5. The gas thus accumulated within the upper portion of the container is fed to the engine through the feed pipe 27, as soon as the engine begins to operate and sufficient suction is created for opening the check valve 26.

It will further be apparent that should the fuel be fed to the engine, in excess of the consumption thereof, the same will accumulate within the float 12 and thus serve to close the valve 20 in proportion to the consumption of the engine.

Proper adjustment between the link 18 and lever 19 is provided by means of a series of openings 28 formed in the link for adjustably receiving the pivot pin 29 forming the connection between the link and the lever.

The plug 9 fitted in the coupling 7 also provides means for lubricating the valve 20.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A fuel feed regulator of the class described comprising in combination, a closed container having a feed pipe extending vertically therethrough, a valve interposed in said feed pipe and positioned within the container, a float operable within the container and open at its lower end, a pipe extension communicating with said feed pipe and terminating within the float whereby to admit fuel into the float, in excess of the consumption thereof and means operatively connecting the float with said valve.

2. A fuel feed regulator of the class described comprising in combination a closed container having a fuel feed pipe extending vertically therethrough, a valve interposed in said pipe and positioned within the upper portion of the container, said container being partially filled with liquid, a float operable within the container and open at its bottom, a pipe extension connected with said feed pipe and terminating within the float, means operatively connecting the float with the valve and a fuel feed pipe communicating with the upper portion of the container and connected with the feed pipe beneath the same whereby to provide an escape for the fuel accumulated within the upper portion of the container above the float.

3. A fuel feed regulator of the class described comprising in combination a closed container having a fuel feed pipe extending vertically therethrough, a valve interposed in said pipe and positioned within the upper portion of the container, said container being partially filled with liquid, a float operable within the container and open at its bottom, a pipe extension connected with said feed pipe and terminating within the float, means operatively connecting the float with the valve and a fuel feed pipe communicating with the upper portion of the container and connected with the feed pipe beneath the same whereby to provide an escape for the fuel accumulated within the upper portion of the container above the float, and a check valve interposed in said last named feed pipe.

4. A fuel regulator for natural gas engines comprising a closed container having a fuel feed pipe extended vertically therethrough, a control valve interposed in said pipe and positioned within the upper portion of the container, said container being partially filled with liquid, a float operable within the container and open at its lower end, a pipe extension connected with said feed pipe at a position adjacent the lower portion of the container and terminating within the float adjacent the upper portion thereof, a link pivotally attached to the top of the float, a lever pivotally connecting the link with said valve, means for adjustably securing the link to said lever, a feed pipe connected at one end to the upper portion of the container with its opposite end attached to the first named feed pipe below the container whereby to provide an escape for the fuel accumulated within the container above the float and a check valve interposed in said last named feed pipe.

5. An automatic fuel control for natural gas engines comprising a closed cylindrical float container comprising a body of non-freezing liquid partially filling said float container, a semi-cylindrical float extending longitudinally within the container and partially submerged in said liquid, said float being open at its lower end and flattened on one side to provide a pipe receiving space between the said floats and the adjacent side of the container, a fuel feed pipe disposed within said container and extending longitudinally through the container with its inlet end disposed exteriorly of the container for connection with a source of gas supply, and its delivery end also disposed exteriorly of the casing for connection with the engine, a rotary control valve mounted in a portion of the said fuel pipe disposed within the container, a valve operating connection between the control valve and the said float, a by-pass connected with said pipe interiorly of the container below the control valve, said by-pass extending upwardly into the said float with its outlet end above the liquid level, an auxiliary feed pipe arranged exteriorly of the said container with its inlet end communicating with the latter above the float and its other end connected with the delivery end of the feed pipe and a check valve in the inlet end of the said auxiliary feed pipe.

In testimony whereof I affix my signature.

WILLIAM CHARLES LAMBING.